United States Patent [19]

Trimboli

[11] Patent Number: 5,675,505
[45] Date of Patent: Oct. 7, 1997

[54] SINE ON RANDOM DATA ANALYSIS METHOD FOR SIMULATING ENGINE VIBRATION

[75] Inventor: David F. Trimboli, Royal Oak, Mich.

[73] Assignee: Chrysler Corporation, Auburn Hills, Mich.

[21] Appl. No.: 500,425

[22] Filed: Jul. 10, 1995

[51] Int. Cl.[6] ................................................. G01M 7/00
[52] U.S. Cl. .................. 364/528; 364/506; 364/431.08; 73/664
[58] Field of Search ................................ 364/508, 506, 364/431.08, 424, 551.01; 381/94; 73/664

[56] References Cited

U.S. PATENT DOCUMENTS

| | | | |
|---|---|---|---|
| 4,010,637 | 3/1977 | Harwell et al. | 73/71.4 |
| 4,184,205 | 1/1980 | Morrow | 364/508 |
| 4,399,513 | 8/1983 | Sullivan et al. | 364/551 |
| 4,408,285 | 10/1983 | Sisson et al. | 364/508 |
| 4,425,798 | 1/1984 | Nagai et al. | 73/659 |
| 4,520,674 | 6/1985 | Canada et al. | 73/660 |
| 4,537,076 | 8/1985 | Lax et al. | 73/662 |
| 4,584,869 | 4/1986 | Frodsham | 73/35 |
| 4,612,620 | 9/1986 | Davis et al. | 364/551 |
| 4,800,512 | 1/1989 | Busch | 364/551.01 |
| 4,881,404 | 11/1989 | Siegl | 73/119 A |
| 4,885,707 | 12/1989 | Nichol et al. | 364/551.01 |
| 4,991,553 | 2/1991 | Kurihara et al. | 123/425 |
| 5,012,428 | 4/1991 | Ueno et al. | 364/508 |
| 5,069,071 | 12/1991 | McBrien et al. | 73/654 |
| 5,210,836 | 5/1993 | Childers et al. | 395/375 |
| 5,214,960 | 6/1993 | Tsuboi | 73/579 |
| 5,215,059 | 6/1993 | Kaneyasu | 123/425 |
| 5,230,316 | 7/1993 | Ichihara et al. | 123/425 |
| 5,277,584 | 1/1994 | DeGroat et al. | 434/29 |
| 5,293,637 | 3/1994 | Childers et al. | 395/800 |
| 5,297,047 | 3/1994 | Matsuno | 364/431.06 |
| 5,327,541 | 7/1994 | Reinecke et al. | 395/400 |
| 5,345,825 | 9/1994 | Lee et al. | 73/574 |
| 5,347,846 | 9/1994 | Kitano et al. | 73/35 |
| 5,349,537 | 9/1994 | Burger et al. | 364/508 |
| 5,361,213 | 11/1994 | Fujieda et al. | 364/431.08 |

*Primary Examiner*—Emanuel T. Voeltz
*Assistant Examiner*—Demetra R. Smith
*Attorney, Agent, or Firm*—Mark P. Calcaterra

[57] ABSTRACT

A computer-implemented apparatus and method for operating vibrational testing equipment which conducts vibrational testing upon automobile components. Raw engine acceleration data is gathered from a running car so that a sine on random calculation may be performed upon that data. The sine on random calculation uses peak hold envelope data and sin tone data as determined from the acceleration data. Thereupon, an iterative equalization technique operates upon the peak hold envelope data and sine tone data to generate a vibrational testing specification. The vibrational testing specification defines how the vibrational testing equipment should operate by specifying such parameters as the gain, the sweep duration, and the time to run the vibrational test in order to achieve a particular reliability and confidence level.

16 Claims, 10 Drawing Sheets

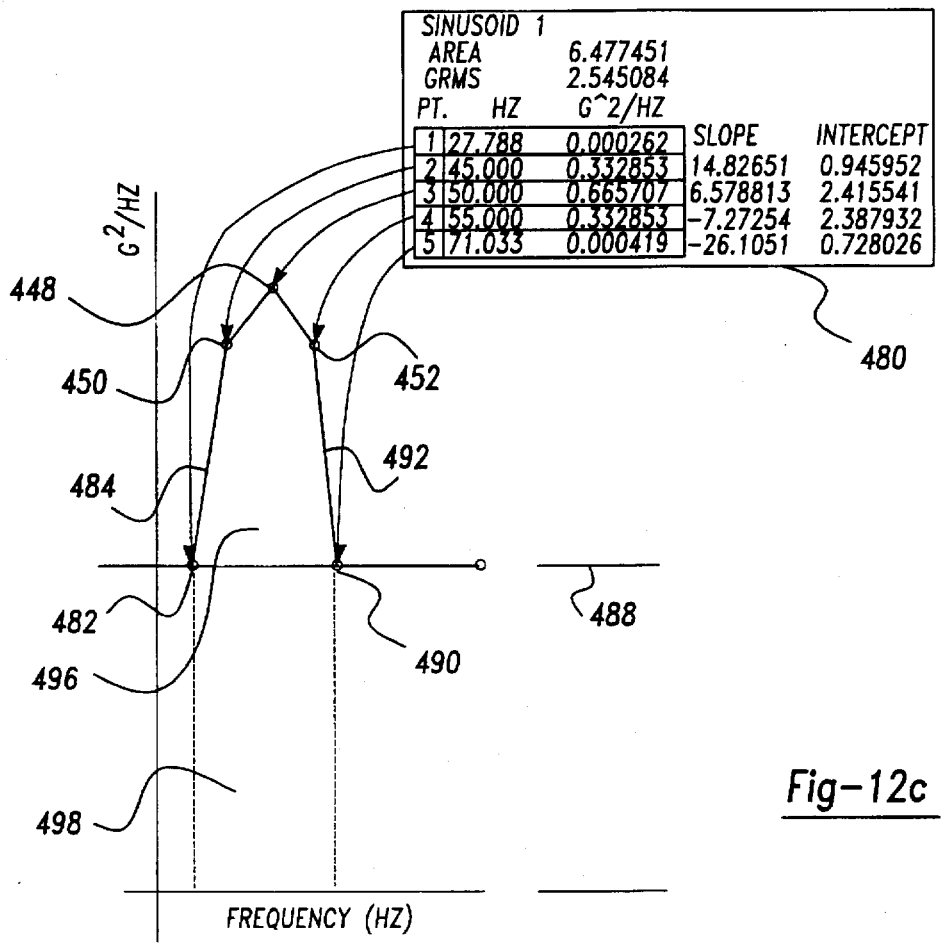

*Fig-12c*

| CONFIDENCE RELIABILITY AND SCALING SCREEN | | | EQUALIZE |
|---|---|---|---|
| DURATION SCALING | | SCALED LEVELS | |
| ORIGINAL TEST TIME | 133.77 HRS | NEW TOTAL GRMS | 18.848 |
| DESIRED TEST TIME | 133.77 HRS | NEW FLOOR GRMS | 2.058 |
| INPUT EXPONENT | 0.16 | NEW SINE GRMS | 18.736 |
| EQUALIZATION RESULTS | | NEW TIME 0-PK | 46.117 |
| CURRENT TOTAL LEV | 18.848 GRMS | NOTE: EQUALIZATION RESULTS | |
| CURRENT FLOOR LEV | 2.058 GRMS | GOOD ONLY AFTER EQUALIZATION | |
| CURRENT SINE LEVEL | 18.736 GRMS | TABLE | VERIFY |
| TEST LEVEL INC. REQ | 1.000 | | |
| TIME DOMAIN MAX 0-PK | 46.12 G'S | SELECT VERIFY AFTER EQUALIZATION | |
| CONFIDENCE & RELIABILITY | | ACTUAL & ESTIMATED INPUTS | |
| CHI^2 VALUE | 4.605 | ORIG. RANDOM RMS | 4.643 |
| TEST DURATION | 133.77 HRS | MAX TIME DOM. 0-PK | 46.1 |
| INPUT WEIBULL SLOPE | 1.50 | TRIAL RANDOM RMS | 2.054 |
| INPUT # TEST PARTS | 4 | TRIAL TOTAL LEVEL | 18.848 |
| ENTER % RELIABILITY | 90 | dB DIFF RANDOM | -7.066 |
| DURATION AT # PARTS | 414.97 HRS | | |

*Fig-13*

CONFIDENCE RELIABILITY AND SCALING SCREEN  [EQUALIZE]

| DURATION SCALING | | | SCALED LEVELS | |
|---|---|---|---|---|
| 562 — ORIGINAL TEST TIME | 133.77 | HRS | NEW TOTAL GRMS | 19.173 |
| DESIRED TEST TIME | 133.77 | HRS | NEW FLOOR GRMS | 1.890 |
| INPUT EXPONENT | 0.16 | | NEW SINE GRMS | 19.080 |
| EQUALIZATION RESULTS | | | NEW TIME 0-PK | 46.098 |
| CURRENT TOTAL LEV | 19.173 | GRMS | NOTE: EQUALIZATION RESULTS | |
| CURRENT FLOOR LEV | 1.890 | GRMS | GOOD ONLY AFTER EQUALIZATION | |
| CURRENT SINE LEVEL | 19.080 | GRMS | [TABLE]   [VERIFY] | |
| TEST LEVEL INC. REQ | 1.000 | | | |
| TIME DOMAIN MAX 0-PK | 46.10 | G'S | SELECT VERIFY AFTER EQUALIZATION | |
| 560 — CONFIDENCE & RELIABILITY | | | | |
| 564 — CHI^2 VALUE | 4.605 | | ACTUAL & ESTIMATED INPUTS | |
| 568 — TEST DURATION | 133.77 | HRS | ORIG. RANDOM RMS | 4.643 |
| 572 — INPUT WEIBULL SLOPE | 1.50 | | MAX TIME DOM. 0-PK | 46.1 |
| 576 — INPUT # TEST PARTS | 4 | | TRIAL RANDOM RMS | 1.891 |
| ENTER % RELIABILITY | 90 | | TRIAL TOTAL LEVEL | 19.173 |
| 580 — DURATION AT # PARTS | 414.97 | HRS | dB DIFF RANDOM | -7.807 |

*Fig-14*

CONFIDENCE RELIABILITY AND SCALING SCREEN  [EQUALIZE]

| DURATION SCALING | | | SCALED LEVELS | | 612 |
|---|---|---|---|---|---|
| ORIGINAL TEST TIME | 133.77 | HRS | NEW TOTAL GRMS | 25.987 | |
| DESIRED TEST TIME | 20.00 | HRS | NEW FLOOR GRMS | 2.562 | |
| INPUT EXPONENT | 0.16 | | NEW SINE GRMS | 25.860 | |
| 600 — EQUALIZATION RESULTS | | | NEW TIME 0-PK | 62.479 | |
| CURRENT TOTAL LEV | 19.173 | GRMS | NOTE: EQUALIZATION RESULTS | | |
| 608 — CURRENT FLOOR LEV | 1.890 | | GOOD ONLY AFTER EQUALIZATION | | |
| CURRENT SINE LEVEL | 19.080 | GRMS | [TABLE]   [VERIFY] | | |
| TEST LEVEL INC. REQ | 1.355 | | | | |
| 604 — TIME DOMAIN MAX 0-PK | 46.10 | G'S | SELECT VERIFY AFTER EQUALIZATION | | |
| CONFIDENCE & RELIABILITY | | | | | |
| CHI^2 VALUE | 4.605 | | ACTUAL & ESTIMATED INPUTS | | |
| TEST DURATION | 20.00 | HRS | ORIG. RANDOM RMS | 4.643 | |
| 616 — INPUT WEIBULL SLOPE | 1.50 | | MAX TIME DOM. 0-PK | 46.1 | |
| INPUT # TEST PARTS | 4 | | TRIAL RANDOM RMS | 1.891 | |
| ENTER % RELIABILITY | 90 | | TRIAL TOTAL LEVEL | 19.173 | |
| DURATION AT # PARTS | 62.04 | HRS | dB DIFF RANDOM | -7.807 | |

*Fig-15*

SINE ON RANDOM DATA ANALYSIS METHOD FOR SIMULATING ENGINE VIBRATION

FIELD OF THE INVENTION

The present invention relates generally to engine vibration simulation systems to test performance and quality assurance of vehicle engine components. More particularly, the present invention relates to performing a sine on random data analysis to specify testing parameters for simulating engine vibration on an electrodynamic shaker, for fatigue or functional testing of engine mounted components.

BACKGROUND AND SUMMARY OF THE INVENTION

Vibration testing is important to many technologies, such as building structures, aircraft, and vehicles. The present invention focuses on vibration testing of engine mounted components. A number of test specification techniques or methods can be found in the art which attempt to develop test specifications that mirror the vibrations actually experienced by an automobile component. However, these known test methods are universally time consuming in that they require a large amount of physical calibration testing and retesting of the selected automobile components in order to mirror the actual component's vibration.

The present invention obviates the drawbacks and disadvantages found in the prior art by providing a sine on random data analysis method for simulating engine vibration which allows the user to define an optimal balance between the peak time domain and the frequency domain levels without having to retest the part each time. The present invention develops tests that run on controller software that employ narrow band sweeping random signals superimposed on a random floor. Using this method, a test can be specified using data analysis equipment only, and no trial vinration tests, several hours after the data has been acquired.

The sine on random data analysis system of the present invention includes a reliability testing level determination module for establishing the reliability testing level for the vibrational testing equipment. The acceleration data conversion module converts the raw acceleration data of a physical object into converted acceleration data that is acceptable for the sine on random data calculation and equalization. A random floor data generation module generates the random floor data that is representative of the converted acceleration data. A peak hold envelope data generation module uses the converted acceleration data to generate peak hold envelope data. A sine tone data generation module uses the random floor data generation and the peak hold envelope data to generate sine tone data. Lastly, a vibrational testing specification module produces the testing parameters that will dictate the operation of the vibrational testing equipment upon the engine component in accordance with the converted acceleration data and the reliability testing level.

Accordingly, it is a primary object of the present invention to provide a Sine On Random Data Analysis Method For Simulating Engine Vibration which provides optimal balance between peak time doman and frequency domain levels in a substantially reduced time frame.

Another object of the present invention is to provide vibrational testing in conjunction with controller software that employ narrow band sweeping random signals superimposed on a random floor.

A further object of the present invention is to provide a reliability testing level determination module for establishing vibrational testing levels.

Additional objects, advantages, and features of the present invention will become apparent to one skilled in the art from the following description and appended claims, taken in conjunctuion with the accompanying drawings.

BRIEF DESCRIPTION OF THE DRAWINGS

FIG. 12c is a graph of frequency versus amplitude showing an example of the results of the equalization iterative solution method being mapped to the graphical display of its sine tone;

FIG. 13 is the computer screen showing the confidence, reliability and scaling screen detailing the modification of the random floor level as a function of the time domain 0-Peak level;

FIG. 14 is the computer screen showing the confidence, reliability and scaling screen detailing the entry of statistical information;

FIG. 15 is the computer screen showing the confidence, reliability and scaling screen detailing the modification that may be done to scale the duration of the test;

DETAILED DESCRIPTION OF THE PREFERRED EMBODIMENTS

Figure 1:
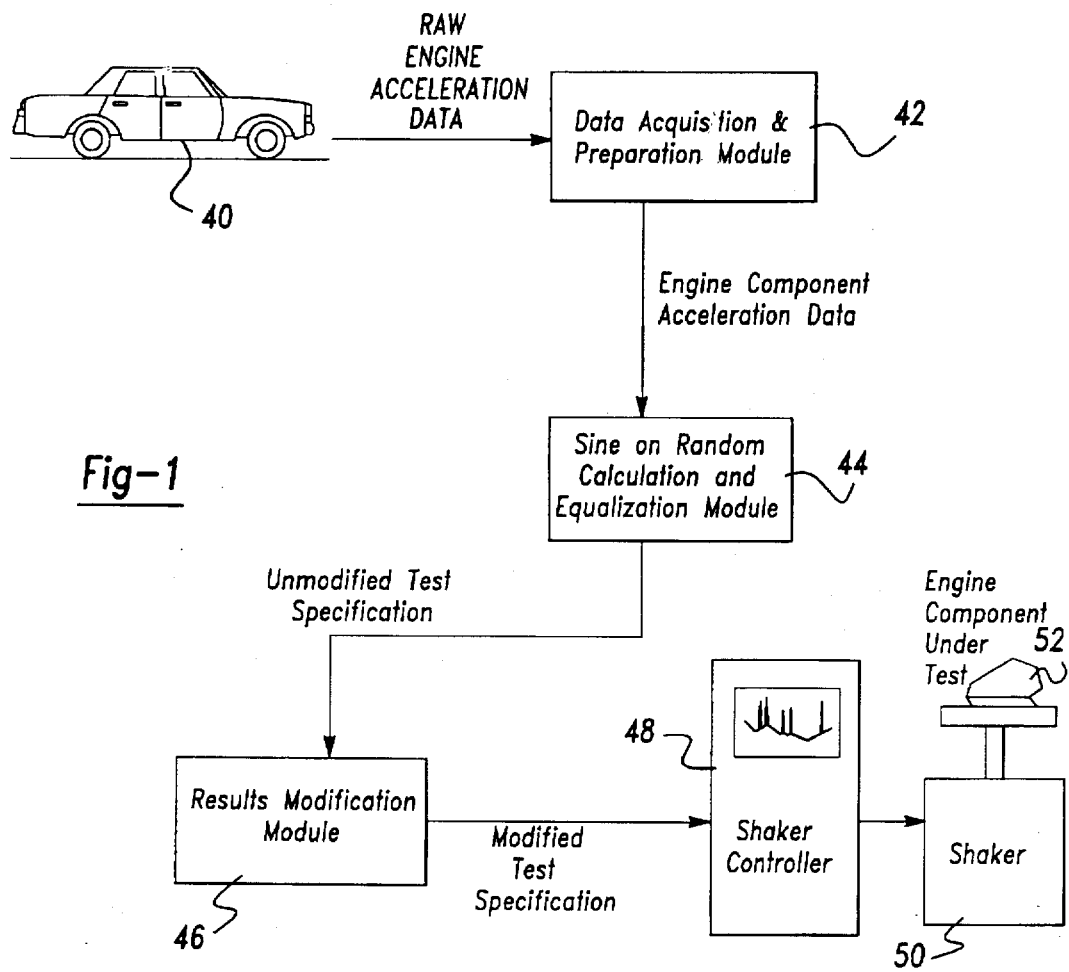
FIG. 1 is a flow diagram showing the system top-level functions for generating the test specifications.

The sine on random data analysis method produces specifications for vibrational testing of an engine component based upon historical acceleration data. FIG. 1 shows the system top-level functions for generating the test specifications. Initially, raw engine component acceleration data is acquired by the data acquisition and preparation module 42 from an unloaded (neutral) or loaded (in-gear) engine of a car 40. This data is gathered by using an accelerometer upon the engine component. The raw engine component acceleration data is then prepared by block 42 into a format acceptable to perform the sine on random data analysis calculations.

The sine on random data calculation and equalization module 44 converts the prepared engine component acceleration data into a suboptimal test specification. The results modification module 46 optimizes the test specification using the prepared engine component acceleration data. The modified test specification is entered into a shaker controller 48.

The shaker 50 vibrates the engine component under test 52 as controlled by the shaker controller 48 in accordance with the modified test specification. The shaker in the preferred shaker controller is an electrodynamic shaker. In particular, the preferred shaker controller is the Genrad shaker controller which employs narrow-band sweeping random signals superimposed on a random floor. An electrodynamic shaker includes a computerized controller that simulates the mechanical vibration environment of the engine component with a high degree of controllability.

Data Acquisition and Preparation Module

The first step in the data acquisition and preparation module 42 is to acquire the acceleration data on selected components by using a loaded or unloaded engine and slowly increasing the rpm of the engine. The data is acquired after an accelerometer is placed upon the loaded or unloaded engine component that is to be tested upon the shaker 50. The term "unloaded engine" simply signifies that the engine is in neutral. The term "loaded" is defined by an engine that is in-gear, with a wide open throttle.

The accelerometer itself is typically a triaxial accelerometer which is capable of sensing vibrations over a wide range of amplitudes and frequencies in three degrees of freedom. For example, an accelerometer will measure engine vibration in units of "g" (where 1 g=386 inches per second$^2$ or 980 centimeters per sec$^2$).

The accelerometer acquires the vibration data created on the engine that has been reved from idle to maximum engine RPM. The length of time normally used is 40 seconds between the idle and maximum engine RPM. The neutral state of the engine is preferable since the maximum acceleration levels typically occur in neutral and not when the engine is in gear. The accelerometer produces time data versus acceleration data.

The next step is to screen the data for noise to ensure that the data had been gathered correctly. The screening process reviews the data to ensure that no dropouts in the data had occurred and that there are no noise problems.

Figure 2:
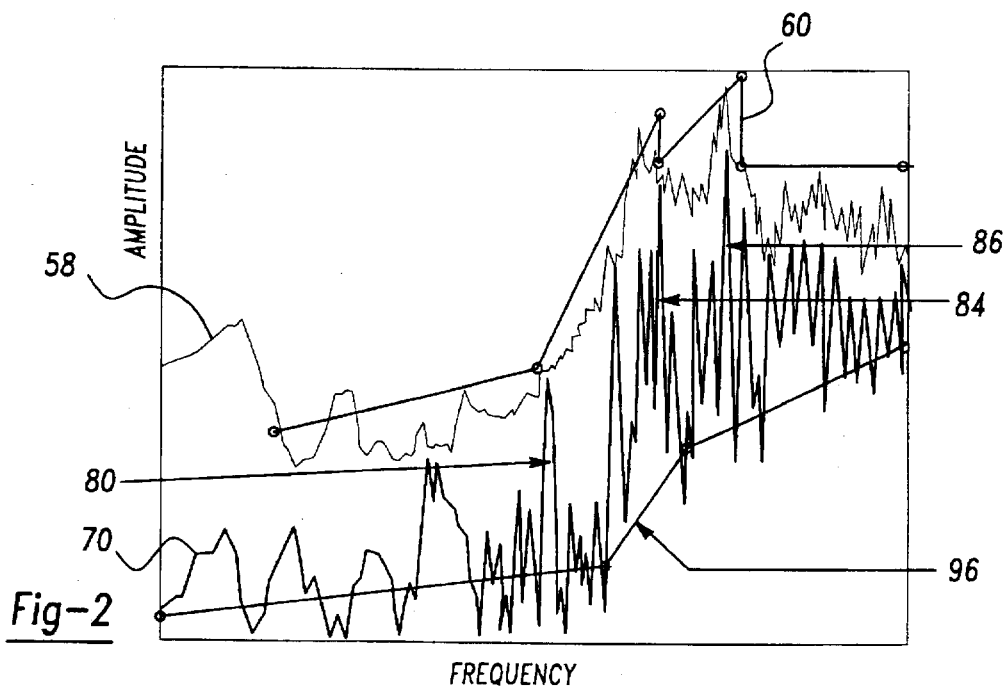
FIG. 2 is a graph of frequency versus amplitude for the engine acceleration data, the peak hold envelope and random noise floor.

The raw screened acceleration data gathered during the neutral rev test is transformed from the time domain to the frequency domain. Part of this purpose is to create a peak hold fast fourier transform (FFT) plot so that an upper amplitude envelope may be established. Referring to FIG. 2, the transformed raw peak hold envelope data 58 is examined for the maximum amplitude at each frequency during the whole neutral rev test. Connected line segments model the transformed raw peak hold envelope data 58 and establishes the peak hold envelope 60.

The next step in the data acquisition and preparation module 42 is to create a snapshot power spectral density (PSD) at maximum engine rpm. This snapshot PSD plot is in terms of g$^2$ per hertz instead of g's. The PSD data assists to define the random floor data.

As depicted on FIG. 2, the snapshot PSD or FFT data 70 represents the instantaneous or snapshot frequency vs. amplitude of the engine at peak engine rpm. The instantaneous nature of this data marks the chief distinction from the Peak Hold FFT data or the Peak Hold PSD data and shows which individual engine orders are responsible for creating the peak hold envelope 60. The following references provide a more detailed explanation of the FFTs and PSDs: Random Data Analysis and Measurement Procedures, Second Edition by Julius S. Bendat (Wiley-Interscience Publication, N.Y.); and Engineering Applications of Correlation and Spectral Analysis by Julius Bendat (Wiley-Interscience Publication, N.Y.).

The next step is to measure the peak time domain level by locating the maximum acceleration from the raw acceleration data gathered during the neutral rev test filtered to the test frequency bandwidth. The peak time domain level establishes the maximum amplitude that the test on the shaker 50 will operate.

Figure 3:
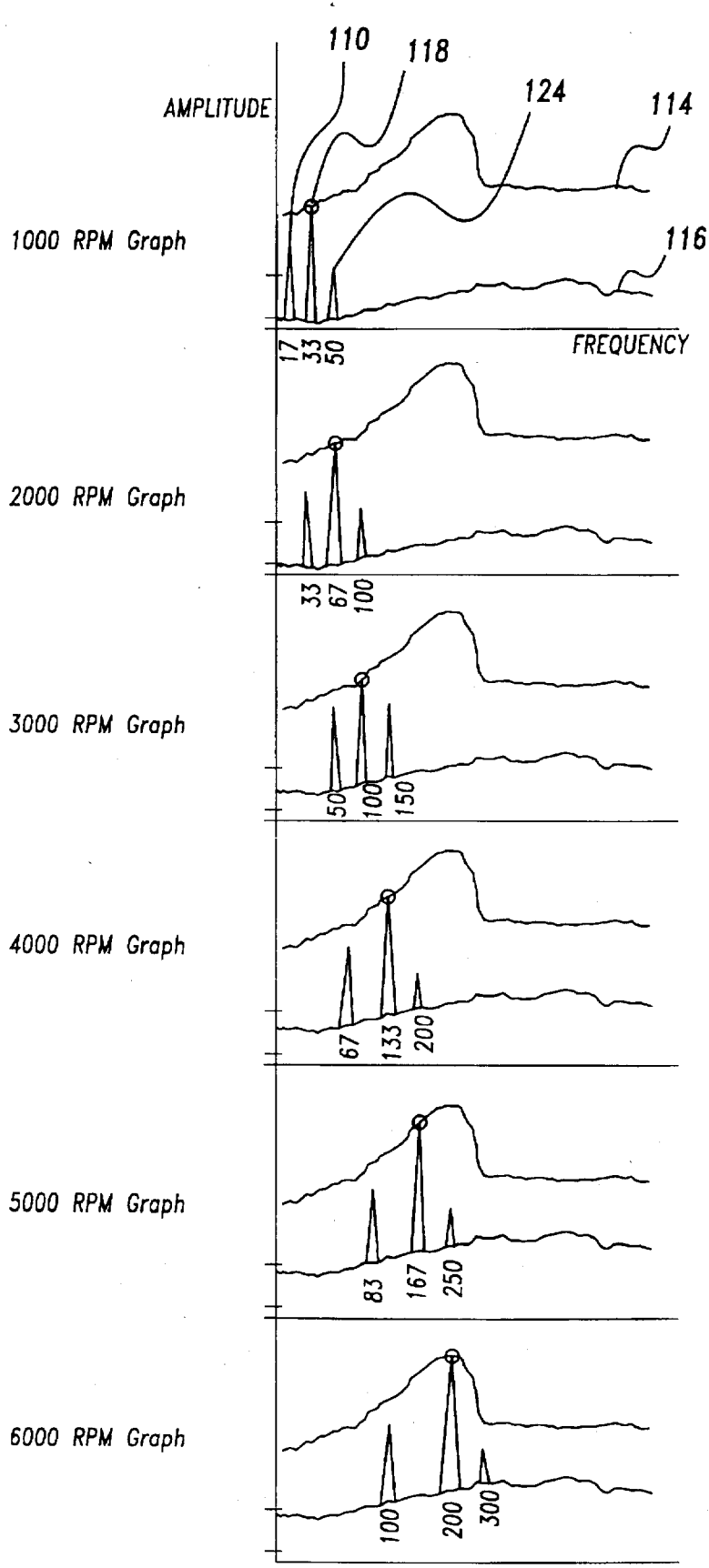
FIG. 3 depicts six frequency vs. amplitude graphs corresponding to the engine operating from 1000 RPM to 6000 RPM in increments of 1000 RPM.

Additional acceleration data is gathered over a more complete RPM spectrum of the engine. This data is screened in the same manner as used above. The raw screened acceleration data is converted into the frequency domain. FIG. 3 depicts six frequency vs. amplitude graphs corresponding to the engine operating from 1000 RPM to 6000 RPM in increments of 1000 RPM. Each graph represents the engine at an instant RPM value—hence, terming the graph an instantaneous (or snapshot) FFTs.

The key engine orders and levels for modeling are derived from both the peak hold and snapshot frequency analysis. Essentially, this step locates the engine orders responsible for tracing out the peak hold envelope 60. First, the engine order frequency values are calculated according to the equation:

Engine order frequency value (Hz)=N * C * O where:

N=crankshaft revolutions per minute;

C="1 minute/60 seconds"

O=engine order number.

Thus to determine the frequency value of the first engine order for an engine operating at 1000 RPM:

Engine order #1 frequency value=(1000 RPM) * (1 cycle/1 revolution) * (1 min/60 secs) * (1)

Engine order #1 frequency value=16.6 Hertz

The frequency value for the higher engine orders is determined by multiplying the first engine's frequency value by the respective engine order number. Thus for engine order #2, the frequency value would approximately be 33 Hertz (i.e., 16.6 Hertz multiplied by 2). Similarly for engine order number 3, the frequency value would approximately be 50 Hertz (i.e., 16.6 Hertz multiplied by 3). Table 1 below contains the calculated engine order frequency data for an engine operating from 1000 RPM to 6000 RPM in increments of 1000 RPM.

TABLE 1

| Engine Revolutions Per Minute | Engine Order #1 Frequency Value (Hz) | Engine Order #2 Frequency Value (Hz) | Engine Order #3 Frequency Value (Hz) |
| --- | --- | --- | --- |
| 1000 | 17 | 33 | 50 |
| 2000 | 33 | 67 | 100 |

TABLE 1-continued

| Engine Revolutions Per Minute | Engine Order #1 Frequency Value (Hz) | Engine Order #2 Frequency Value (Hz) | Engine Order #3 Frequency Value (Hz) |
| --- | --- | --- | --- |
| 3000 | 50 | 100 | 150 |
| 4000 | 67 | 133 | 200 |
| 5000 | 83 | 167 | 250 |
| 6000 | 100 | 200 | 300 |

Next, the engine orders are located upon each of their respective instantaneous FFT graphs. For example, engine order #1 110 is found on the 1000 RPM graph by locating the amplitude based on its frequency value of 17 Hertz. The engine orders whose amplitudes are consistent with the peak hold envelope 114 are chosen for modeling. Typically, the lower orders are mainly responsible for both tracing out the peak hold envelope and causing the most amount of vibrational damage to the component. The random floor is labeled 116. FIG. 3 shows engine order #1 as the first sine tone of each graph, engine order #2 as the second sine tone of each graph, and engine order #3 as the third sine tone of each graph. Thus for example, engine order #1 110 for the 1000 RPM graph is the first sine tone; the engine order #2 118 for the 1000 RPM graph is the second sine tone; and engine order #3 124 for the 1000 RPM graph is the third sine tone.

The vibration vernacular uses the following terms to describe the vibrational characteristics. Each of the triangular shaped objects on the graphs are termed a "sine tone". The term "sine tone 1" refers not to a particular "order", but rather only to the fact that this sine tone is the sine tone chosen to model the peak hold envelope. Thus, the term "sine tone 1" may represent any one particular sine tone order as long as that one particular sine tone is responsible for "tracing out" a portion of the peak hold envelope.

In FIG. 3, engine order #2 is selected for modeling since its amplitude is consistent with the peak hold shape. The first and third order amplitudes for each of the graphs are always substantially lower than the peak hold envelope 114. The higher engine orders should be investigated to determine if they too exhibit behavior consistent with the peak hold envelope 114.

Figure 4:
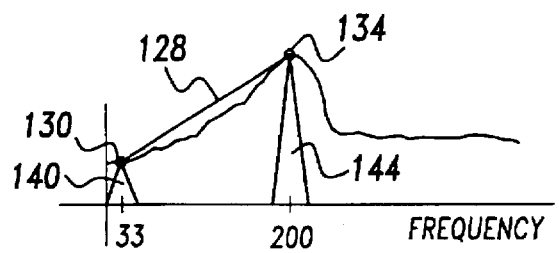
FIG. 4 is a graph showing a generalized representation of the maximum and minimum of one engine order for choosing the maximum envelope.

The next step is to choose the best straight line segments for the chosen second order sine tone. In FIG. 4, line segment AB 128 has its lower endpoint "B" 130 defined by the lower second order sine tone 140 and its upper endpoint "A" 134 defined by the highest second order sine tone 144. Through this approach, the chosen sine tone models the appropriate peak hold envelope.

Figure 5:
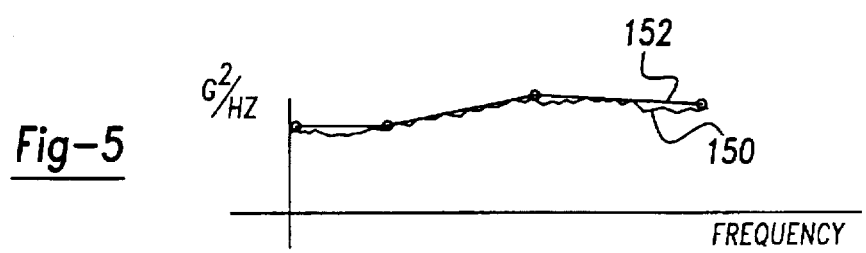
FIG. 5 is a graph showing the instantaneous PSD against the peak hold envelope for defining the random noise floor.

The last step of the data acquisition and preparation module 42 is to define the random noise floor. The random noise floor is a representation of the maximum noise floor of a certain location. The maximum noise floor typically occurs at peak engine RPM. First, the random floor analysis is performed in terms of $G^2/Hz$ vs. frequency—as opposed to the above analysis which was performed in G's vs. frequency. Referring to FIG. 5, the instantaneous (snapshot) PSD 150 is displayed. When the random background noise has reached a maximum, the instantaneous shape is enveloped thereby producing the random noise floor envelope 152 input to the program.

Figure 6:
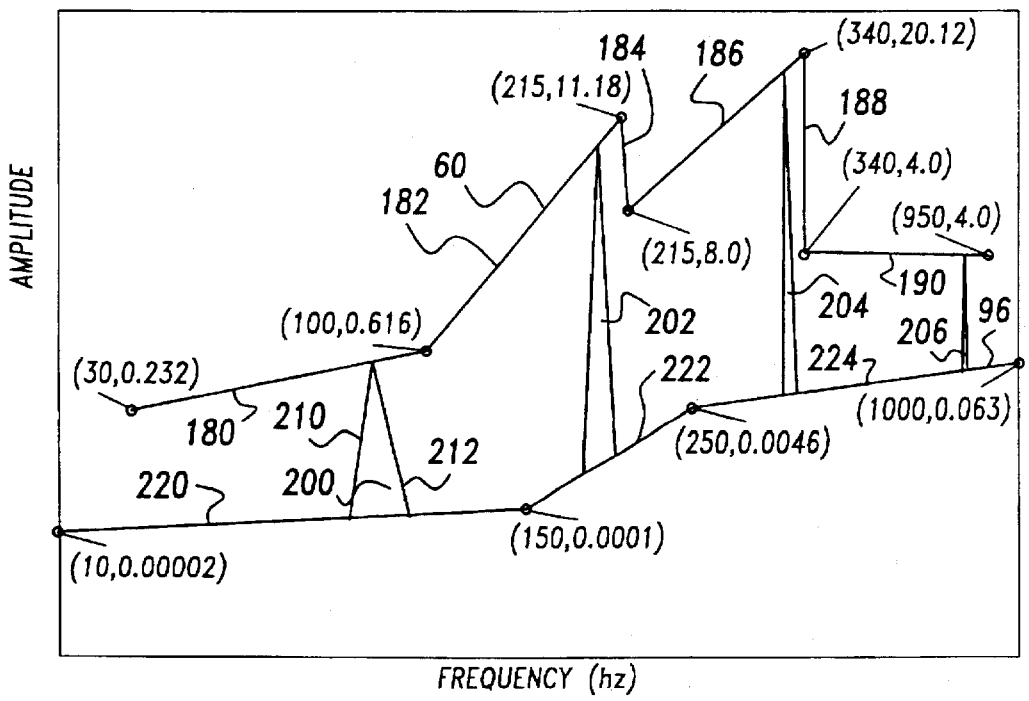
FIG. 6 is a graph of frequency versus amplitude for the peak hold envelope, sine tones, and random noise floor which depicts all necessary input data into the calculation module.

The graph in FIG. 6 summarizes all of the required input data for the sine on random data calculation and equalization module 44. The input summary graph shows the peak hold envelope 60, sine tones 1 to 4 (i.e., 200, 202, 204, 206), and the random noise floor 96. Sine tone 1 200 models the peak hold envelope line segment 1 180. Sine tone 2 202 models the peak hold envelope line segment 2 182. Sine tone 3 204 models the peak hold envelope line segment 4 of 186. Sine tone 4 26 models the peak hold envelope line segment 6 190. Sine tones are not needed to represent either the peak hold envelope line segment 3 184 and the peak hold envelope line segment 5 188 since these two line segment represent only discrete drops in the peak hold envelope.

Furthermore, the input summary graph depicts the line segments of the random noise floor 96 as broken up into three segments (220, 222, and 224). The sine on random calculation and equalization module 44 will use the data point values that mark the beginning and ending points for each of the random noise floor line segments in the units of $G^2/Hz$.

Lastly, the input summary graph depicts the intersection information between the random floor and the sine tones. According to the graph, the left side 210 of sine tone 1 200 intersects the random floor line segment 1 220. Correspondingly, the right side 212 of sine tone 1 200 intersects the random floor line segment 1 220. Table 2 contains the intersection data of the random floor and the sine tones.

TABLE 2

| Sine Tone # | Side | Intersects Random Segment |
| --- | --- | --- |
| 1 | Left | 1 |
| 1 | Right | 1 |
| 2 | Left | 2 |
| 2 | Right | 2 |
| 3 | Left | 3 |
| 3 | Right | 3 |
| 4 | Left | 3 |
| 4 | Right | 3 |

The Sine On Random Calculation and Equalization Module

The first step of the sine on random calculation and equalization module 44 is to enter the number of cycles to demonstrate infinite life. This value accounts for the different fatigue characteristics for different materials. These characteristics define the number of cycles by which if the test of the engine component remains below a certain amplitude (i.e., its fatigue limit), the engine part will never fail. The number of cycles is used to calibrate the tests and if the maximum levels in the test are below the stress threshold of the part, then, it should theoretically never fail if it passes that many cycles—or stated alternatively, the part will have "infinite life" if the part is tested below its "fatigue limit".

Figure 7:
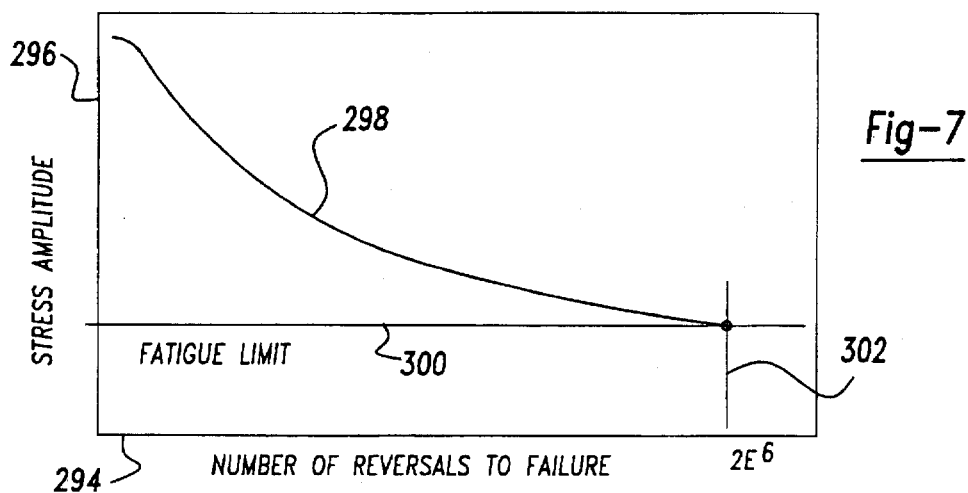
FIG. 7 is a graph of number of reversals to failure versus stress amplitude which shows the fatigue relationship of a material.

Vibration testing uses the "infinite life" concept in reverse. Instead of looking for a stress that will not cause a failure, parts are run to the number of cycles that is equivalent to the fatigue limit stress (e.g., for steels $2e^6$ reversals at the specified vibration test level). If no failures are found, then the present inventions assumes is that all of the stress in the part was below the fatigue limit of that material. Referring to FIG. 7, the abscissa axis is the number of reversals to failure 294 and the ordinate axis is the stress amplitude 296. The stress life plot 298 for steel is shown with its fatigue limit 300. The reversal value 302 designates the number of reversals at the fatigue which for steel is typically $2e^6$ (i.e., $1e^6$ cycles).

Figure 8:
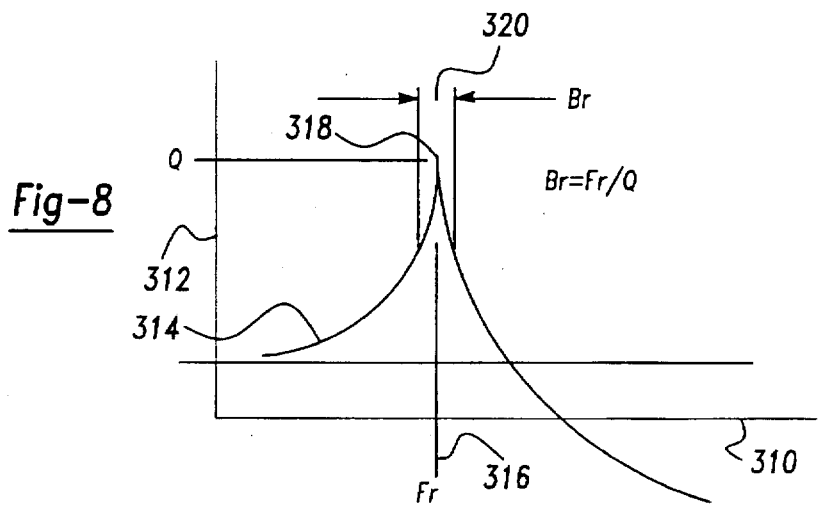
FIG. 8 is a graph of frequency versus gain of the system for determining the half-power band width.

The next substep of the step to determine infinite life is to decide by what minimum frequency span are the cycles to be counted in order to cover each resonance of a component. A conservative estimate is made of the minimum frequency span over which to accumulate the $1e^6$ cycles. This is done by defining the minimum half power bandwidth over a single degree of freedom system. With a sweeping sine tone, the frequency range in which to accumulate the 2e^6 reversals (i.e., 1e^6 cycles) in the half power bandwidth of a resonance must be defined. Referring to FIG. 8, the abscissa axis is the frequency axis 310 and the ordinate axis is the gain of the system 312. The system's gain-frequency curve 314 shows the "Q" value 318 of the system at the system's resonance frequency 316. The half-power band width 320 is calculated according to the following equation:

$$Br=Fr/Q$$

where:

Q=the gain of the system at the resonance frequency;

Fr=the resonance frequency; and

Br=the half-power bandwidth of the resonance.

Since the determination of each component's resonance is impractical, estimates of the Q and resonance frequencies are provided by the present invention to determine a minimum half power bandwidth.

Figure 9:
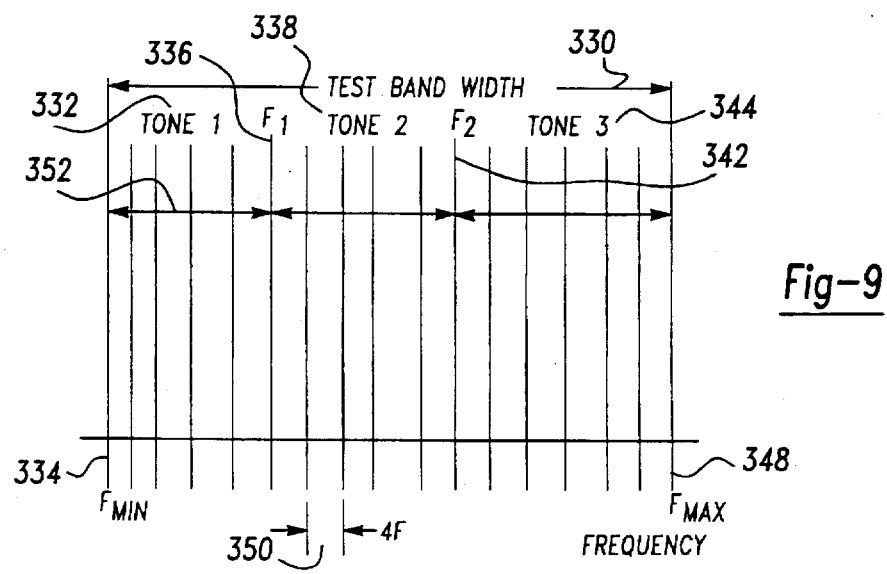
FIG. 9 shows the test bandwidth in which the sine tones may range.

Referring to FIG. 9, the test bandwidth 330 comprises, for this example, three sine tones: sine tone 1 332 which sweeps between $F_{min}$ 334 and $F_1$ 336; sine tone 2 338 which sweeps between $F_1$ 336 and $F_2$ 342; and sine tone 3 344 which sweeps between $F_2$ 342 and $F_{max}$ 348. The test bandwidth 330 is divided into subregions of length of $\Delta f$ 350 to ensure that every resonance is adequately tested. Here, $\Delta f$ 350 is the minimum Br in which the 1e^6 cycles is to be accumulated.

The second step in the sine on random data calculation and equalization module 44 is to enter the random noise floor data into this module. This data is obtained from the data acquisition and preparation module 42 and represents the points that define the random noise floor. For example, the random floor data may assume the following values as in table 3:

TABLE 3

| Hz | G^2/Hz |
|---|---|
| 10.0 | 0.000020 |
| 150.0 | 0.000100 |
| 250.0 | 0.004600 |
| 1000.0 | 0.063000 |

Slope and area data depicting the random noise floor data is then automatically generated from table 3 and assumes the following values as shown in the last three columns of Table 4:

TABLE 4

| Hz | G^2/Hz | b (slope) | A (area) |
|---|---|---|---|
| 10.0 | 0.000020 | | |
| 150.0 | 0.000100 | 0.594316 | 0.009283 |
| 250.0 | 0.004600 | 7.495007 | 0.133608 |
| 1000.0 | 0.063000 | 1.887823 | 21.41752 |

The third step in the sine on random data calculation and equalization module 44 is to enter the sweep ranges for each sine tone. If all sweep ranges are contiguous, the lowest frequency of the first sine tone in the first row of the column that reads "LOWER FREQ (HZ)" (n.b.: "FREQ" is short for frequency) is entered into the module. The maximum frequency values of each sweep in the column that reads "UPPER FREQ (HZ)" is next entered. The rest of the rows under "LOWER FREQ (HZ)" are automatically adjusted to show the beginning frequency of each sweep if the sweeps are to be harmonically related.

Since the preferred shaker controller only allows for sweeps that are contiguous in nature the adjusted values for all of the lower frequencies are shown in the column labeled "LOWER FREQ ADJUSTED".

Two other values need to be entered: the approximate loop time and the resolution bandwidth used on the preferred shaker controller. When the final specification is running the loop time is the time between screen updates on the preferred shaker controller. If using 400 lines and the default values for the discount exponent and the number of frames per loop; a loop time of seven to eight seconds is reasonable. This value should be verified. The resolution bandwidth used on the preferred shaker controller is the total frequency bandwidth divided by the number of frequency lines. The smaller this bandwidth is, the closer the narrow band random tones will simulate a sine tone. The "MIN (LOG) SWEEP (MIN)" value is the minimum length of time (in minutes) required to sweep all tones from their lowest frequency to their highest frequency. The calculation is on the longest sweep range. This value is calculated as follows (assuming a logrythmic sweep):

$$D>=2*(Lt)*[Ln(Fmax/Fmin)/Ln(Fmax/(Fmax-BW))]$$

where:

D=Sweep time, also known as the sweep duration (units of seconds, one way up or down);

Lt=Loop Time (units of seconds, time between screen updates);

Fmax=Highest frequency in sweep (units of Hz);

Fmin=Lowest frequency in sweep (units of Hz);

BW=Resolution Bandwidth (units of Hz, Total Frequency Span/# #of lines); and

Ln=Natural Log

This sweep time is set to ensure that the preferred shaker controller will always maintain control of the sweeping sine tones.

An intermediate test duration is then calculated based on accumulating the number of specified cycles in each half power bandwidth. This is calculated for 1 sine tone sweeping the total test bandwidth.

Ct=((Fm-Fl)/Br) * Cy

T=Ct(Ln(Fm)-Ln(Fl))/(Fm-Fl)

where:

Ct=The number of cycles required in the total test;

Cy=The number of cycles to accumulate in each ½ power bandwidth Br;

Fm=The upper frequency of the test;

Fl=The lower frequency of the test; and

T=The time to sweep between Fm and F1 (units of seconds); or intermediate test duration for 1 tone sweeping the total test bandwidth.

But there is more than 1 sine tone per test. Therefore, the number of cycles accumulated in a smaller sweep range fm to fl is required and can be calculated as follows:

$$t=[(T/(Ln(Fm/Fl))]*[Ln(fm/fl)]$$

This latter equation (i.e., to calculate "t") provides a new time "t" that it takes to sweep the smaller range. Table 5 shows the duration in hours required for each sweep range.

TABLE 5

| SWEEP # | HOURS | # OCTAVES |
| --- | --- | --- |
| 1 | 134 | 1.736966 |
| 2 | 85 | 1.104337 |
| 3 | 51 | 0.661198 |
| 4 | 114 | 1.482393 |

The longest sweep time in this table is what defines the original test time and is read into the original test time cell of the confidence, reliability and scaling screen. Note that this longest time (t/D) defines the number of sweeps in the test.

Sweep ranges for each sine tone measure how far each one of the sine tones is sweeping back and forth along the abscissa axis. For example, sine tone 1's sweep range 352 on FIG. 9 designates the frequency range of sine tone 1 332 as being from $F_{min}$ 334 to $F_1$ 336. The sweep ranges and the time to sweep once determine the maximum duration of the sine tones and the maximum duration establishes the original duration of the test.

The fourth step in the sine on random data calculation and equalization module 44 is to enter the peak and minimum sine tone levels. These values represent the maximum and minimum levels on the amplitude axis that each of these sine tones will reach as it sweeps back and forth between the minimum and maximum levels.

Table 6 shows results of entering the maximum and minimum sine tone levels. For spreadsheet calculation purposes the maximum level must always be at the maximum frequency and the minimum level must be at the minimum frequency. Constant acceleration levels are possible at best.

TABLE 6

| SINE TONE | G'S PEAK | G'S MIN |
| --- | --- | --- |
| 1 | 0.616 | 0.232 |
| 2 | 11.18 | 0.616 |
| 3 | 20.12 | 7.99 |
| 4 | 4 | 4 |

The fifth step in the sine on random data calculation and equalization module 44 is to enter the random segment and the sine tone intersection values. These values will allow the areas under each sine tone to be calculated later. The sample intersection data of the sine tone sides and the random floor are entered into the module and displayed in Table 7. For example, the left side of the first sine tone intersects the first random segment. This table must include this breakdown of each sine tone that is being modeled.

TABLE 7

| RANDOM SEGMENT | SINE # | SIDE | RANDOM DATA | | | |
| --- | --- | --- | --- | --- | --- | --- |
| | | | HZ | G^2/HZ | SLOPE | HZ |
| 1 | 1 | L | 10 | 1.2E-06 | 0.594316 | 150 |
| 1 | 1 | R | 10 | 1.2E-06 | 0.594316 | 150 |
| 2 | 2 | L | 150 | 6.0E-06 | 7.495007 | 250 |
| 2 | 2 | R | 150 | 6.0E-06 | 7.495007 | 250 |
| 3 | 3 | L | 250 | 0.000278 | 1.887823 | 1000 |
| 3 | 3 | R | 250 | 0.000278 | 1.887823 | 1000 |
| 3 | 4 | L | 250 | 0.000278 | 1.887823 | 1000 |
| 3 | 4 | R | 250 | 0.000278 | 1.887823 | 1000 |

Figures 10, 11:
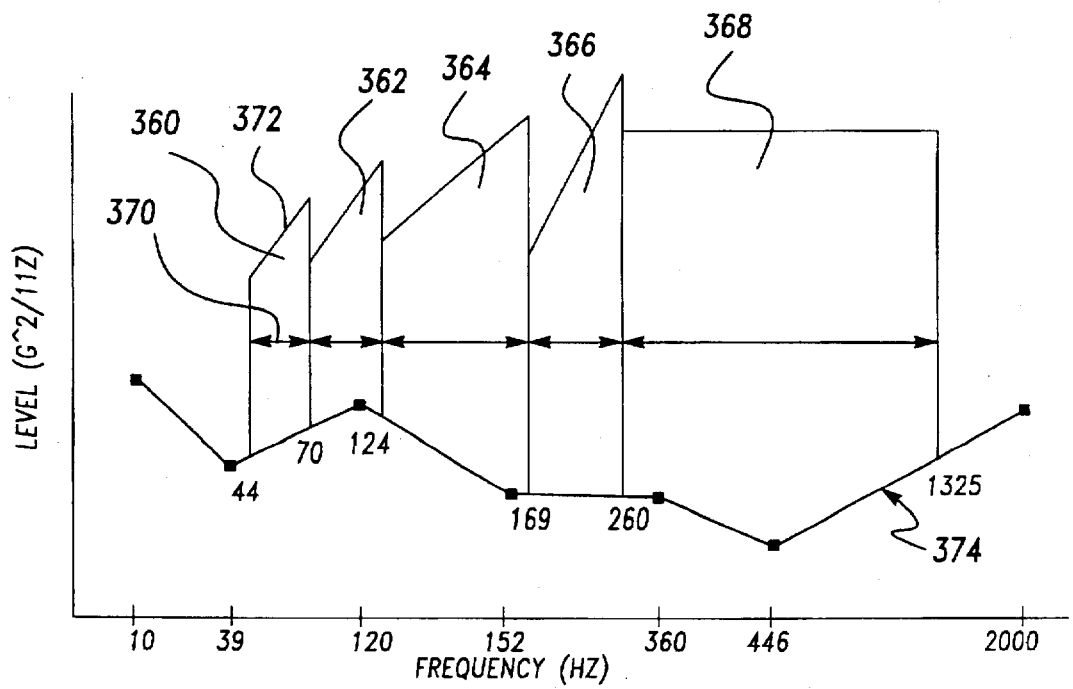
FIG. 10 is the computer screen showing the confidence, reliability and scaling screen.
FIG. 11 is a graph of frequency versus amplitude for demonstrating the different control types that a sine tone may exhibit.

FIG. 10 shows the confidence, reliability and scaling screen and is the main computer screen for the remainder of the sine on random data vibrational analysis. This computer screen comprises five different sections in this screen: (1) "DURATION SCALING"; (2) "EQUALIZATION RESULTS"; (3) "CONFIDENCE AND RELIABILITY"; (4) "SCALED LEVELS"; and (5) "ACTUAL AND ESTIMATED INPUTS". For the remainder of the sine on random calculation and equalization module 44, only the actual and estimated inputs and the equalization results sections are used. The use of the other computer screen sections will be described later in the discussion of the results modification module 46.

The sixth step in the sine on random data calculation and equalization module 44 is to enter the peak time domain level into the computer screen depicted in FIG. 10. This level is based upon low pass filtered data at the maximum test frequency and was obtained in the data acquisition and preparation module 42. For this example, the measured peak time domain level is 42.5 g's in the time domain as previously determined in the data acquisition and preparation module 42. That value is entered into the maximum time domain zero to peak level cell which is entitled "MAX TIME DOM. 0-PK".

The seventh step in the sine on random data calculation and equalization module 44 is to select a best control method for the sine tones. Four control methods exist for the sine tones:

(1) constant displacement;

(2) constant velocity;

(3) constant acceleration; and (4) straight line.

Five "generic" sine tones are depicted in FIG. 11 and provide examples of each control type. The five sine tones are labeled as sine tone 1 360 sine tone 2 362, sine tone 3 364, sine tone 4 366, sine tone 5 368. The double arrows show the range that each sine tone will sweep out. For example, sine tone 1 360 will sweep from 44 to 70 Hz (i.e., sweep range 1 370) and sine tone 1's peak level 372 will follow the shape of the slanted line that forms the top of sine tone 1 360.

In constant displacement the level varies with frequency squared and is exemplified by sine tone 1 360. In constant velocity, the level varies with frequency as exemplified by sine tone 2 362. Constant acceleration has the level as a constant as frequency is varied and is exemplified by sine tone 5 368. Straight line acceleration is defined by selecting two levels at two different frequencies and connecting the two levels with a straight line. Lastly, the random noise floor 374 is shown in FIG. 11 as the segmented line that ranges from 10 to 2000 Hz.

During the test all of the sine tones are active at once. When the test starts, all of the sine tones are at their lowest frequency and will sweep towards the higher frequencies. If the sweep time is ten minutes, then at the end of ten minutes all of the sine tones will be at their maximum frequencies. All of the control types represent a straight line on a log-log scale. The selection of a control method is based on whichever one will everywhere along the sweep equal or slightly exceed the desired values. Table 8 shows sample values for each type of control method for each sine tone.

TABLE 8

| G'S = (2*G^2/HZ*BW)^0 Amplitude Corrected | | 1.00 = TEST LEVEL SQUARED | | | | | |
|---|---|---|---|---|---|---|---|
| G^2/HZ VALUE PEAK | G^2/HZ VALUE MINIMUM | CONST. DISP IN (PK-PK) | CONST. DISP G'S MIN. | CONST. VELOC. (in/sec) | CONST. VELOC. G'S MIN. | STRAIGHT LINE G'S MAX. | STRAIGHT LINE G'S MIN. |
| 0.0379 | 0.00538 | 0.0012 | 0.0553 | 0.3788 | 0.1848 | 0.6160 | 0.2320 |
| 12.499 | 0.03794 | 0.0047 | 2.4148 | 3.1980 | 5.2 | 11.180 | 0.6160 |
| 40.481 | 6.4 | 0.0034 | 8.0327 | 3.6393 | 12.722 | 20.120 | 8.0000 |
| 1.6 | 1.6 | 0.0000 | 0.5115 | 0.2589 | 1.4315 | 4.0000 | 4.0000 |

The table is organized as follows, all of the values in row one represent values of the first sine tone expressed in different units, row two represents the analogous values for sine tone two, etc.

Choosing constant acceleration should be obvious, the straight line acceleration selection can be used if no other control type fits. If the value under CONSTANT DISPLACEMENT G'S MINIMUM is only slightly greater than or equal to the STRAIGHT LINE G'S MINIMUM level, constant displacement control can be used for that sweep. If the value under CONSTANT VELOCITY G'S MINIMUM is only slightly greater than or equal to the STRAIGHT LINE G'S MINIMUM level, constant velocity control can be used for that sweep. The columns that read CONSTANT VELOCITY and DISPLACEMENT with the units of velocity or displacement are the actual values for the sweep control.

The eighth step in the sine on random data calculation and equalization module 44 is to equalize the test profile. The equalization of the test profile ensures that the test will conform to all the data that has been prepared and entered into the module. In the equalization process, the random floor segment maintains its same relative shape, but the whole line or profile across the entire spectrum is raised or lowered in order to retain the peak time domain level.

Figure 12A:
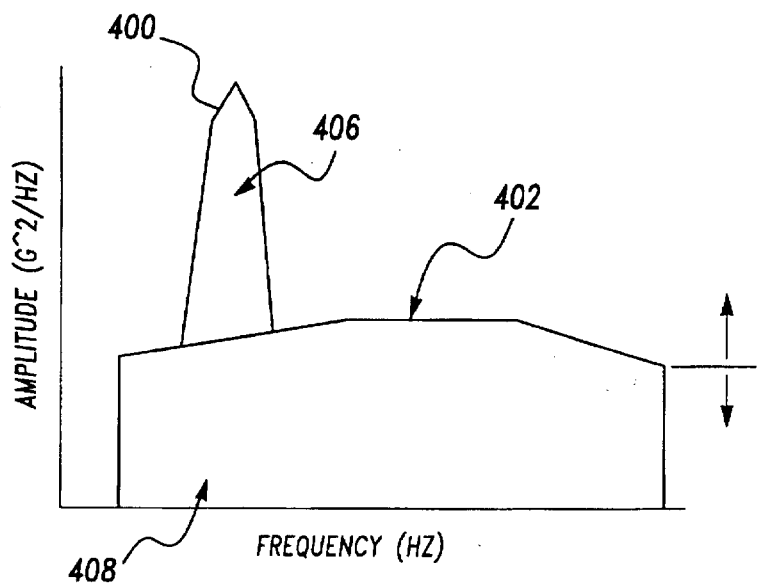
FIG. 12a is a graph of frequency versus amplitude providing a generalized depiction of a sine tone and the random floor.

FIG. 12a provides a backdrop for a discussion of the equalization method by showing a generalized depiction of a sine tone and the random floor. FIG. 12a shows a sine tone peak 400 at the top of its sweep and a random floor 402. If the variable "As" designates the area under the sine tone 406, the root mean square value (RMS) of the sine tone is:

$$Rs=(As)^{0.5}$$

Likewise where Ar is the area of the random floor 408, the RMS of the random floor is:

$$Rr=(Ar)^{0.5}$$

"Rr" and "Rs" are used to calculate the peak measured acceleration time domain level (i.e., "P") according to the following equation:

$$P=Rr*4.2+Rs*2$$

note: the constants "4.2" and "2" in the equation represent a desired sigma levels for the root mean square values.

The equalization method maintains the peak sine tone levels fixed and moves the random floor incrementally. The random floor levels are varied until the values for Ar and As are such that the desired value of "P" is achieved.

Figure 12B:
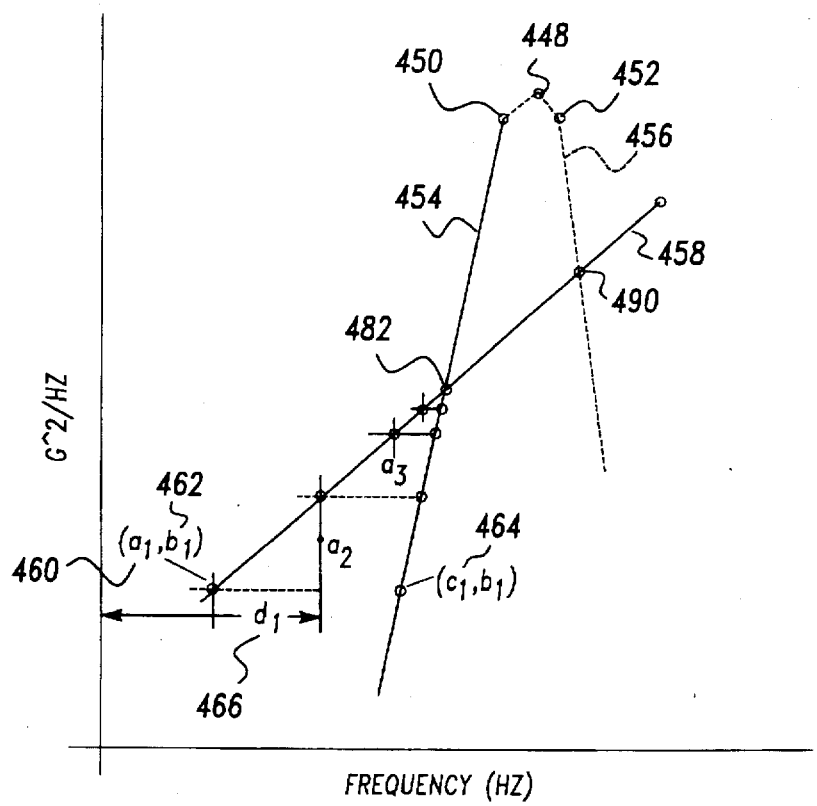
FIG. 12b is a graph of frequency versus amplitude for analyzing a sine tone and the random floor to perform an equalization iterative solution method.

FIG. 12b provides the forum for a more detailed discussion of the equalization step. The positions of point "A" 450 and point "B" 452 are defined. Then, the slope of segment 1 454 and segment 2 456 are defined. The equalization iterative solution method is used to solve for the intersection values of point 482 and point 490.

An iterative method is used since a closed form solution does not exist to solve for the intersection values. The equalization iterative solution method performs the following operations:

(1) The extreme left random floor point (i.e., the value of the frequency) of the random floor segment 458 are substituted for the value of "a". (n.b., for sake of example, the first iteration has the value of "a" at the value of $a_1$ 460).

(2) The G^2/Hz value of the random floor segment 458 at frequency "a" is calculated and becomes the value "b". (n.b., for sake of example, the first iteration has the value of "b" at the value of $b_1$ 462).

(3) Value "c" is the frequency on the sine tone line at the G^2/HZ value "b". (n.b., for sake of example, the first iteration has the value of "c" at the value of $c_1$ 464).

(4) The distance between points "a" and "c" is checked to determine if it is within a certain predefined limit. This limit is user selectable by changing the value in cell ED1. If a and c are closer than the limit, the macro continues to solve for the next point, 490.

(5) If a and c are further apart than the limit, then the value "d" is calculated according to the following equation and is the next estimate for a:

$$d_1=(e_1+a_1)$$

where:

$e_1=(c_1-a_1)/(i)$;
a=the frequency value in operation 1;
c=the frequency value obtained in operation 3; and
i=the increment value (n.b.: the increment value controls the speed of the convergence; the increment value of "1.1" was found to consistently work well). * (n.b., for sake of example, the first iteration has the value of "d" at the value of $d_1$ 466).

(6) $d_1$ is then substituted to $a_2$ which is used in operations 2 through 6.

(7) After all intersection points are solved, then the actual value of Rr is checked against the calculated value of Rr. The first value of Rr is entered as a constant (user definable extreme upper value cell DT23). The calculated value of Rr is calculated according to the following equation:

$$Rr=(P-2*Rs)/(4.2)$$

where:

Rr=RMS of the random floor;
P=peak measured acceleration time domain level; and

Rs=RMS of the sine tones.

(8) If the actual value of Rr is not sufficiently close to the calculated value of Rr, then the random floor value is lowered to the trial random RMS value (i.e., the calculated "Rr") and operations 1 through 7 are repeated. (n.b.: each time a loop is completed by completing operation 7, the estimate for Rs has improved. Since the "P" value is a constant, the estimate for Rr will improve.)

(9) If the actual value of Rr is sufficiently close to the calculated value of Rr, then the equalization iterative solution method can terminate. The limit between the actual Rr and the calculated Rr is user selectable in Cell EA53.

FIG. 12c shows an example of the results of the equalization iterative solution method being mapped to the graphical display of its sine tone. Block 480 shows sample values calculated from the equalization iterative solution method. These sample calculated values define the sine tone's new relationship with the adjusted random floor 488.

Within block 480 (where the column heading "PT." represents a point number), point 1 is the new intersection point 482 between the left side 484 of the sine tone and the adjusted random floor 488. Point 2 is the calculated value of Point "A" 450. Point 3 is the top point 448 of the sine tone. Point 4 is the calculated value of Point "B" 452. Point 5 is the new intersection point 490 between the right side 492 of the sine tone and the adjusted random floor 488.

From these points, the area of the sine tone 496 combined with the area of the area under the adjusted random floor 498 can be calculated. Then the area under the adjusted random floor 498 can be solely calculated. The difference between the combined areas and just the area under the adjusted random floor 498 yields the area of the sine tone 496. The square root of the sum of the areas of all of the sine tones 496 provides the RMS value and will be referenced in the results modification module 46 as "Rs".

The ninth and last step in the sine on random data calculation and equalization module 44 is to verify the equalization results. If any errors are detected during the equalization step, then certain remedies may cure the errors. One possible error is that the time domain 0-PK level must be high enough to yield a positive trial random RMS level.

If the equalization routine worked correctly the sides of each sine tone will exactly meet the line that defines the random floor. They will not extend below or above this line. If they do, go back and reequalize the specification and recheck the plot. No sine tone should be below the random floor at its peak or minimum level.

Completion of the verification step produces a valid specification that can be used to program the preferred shaker controller. Upon entering these values into the controller the total and broad band grms levels should be within 4% of the values in the test specification output. However, the test specification data should be modified so as to produce a more desirable test specification such as one of lesser testing duration.

Results Modification Module

At the end of the sine on random calculation equalization module 44, a complete set of data is available for a test specification, however usually all of the levels are not ideal. Ideally, the simulation test should match the sine tone peak g levels random floor grms level and the maximum time domain 0-PK g level found in the data to be modeled. However, it is rare that all these values will match up between the simulation test and the data to be modeled. Therefore, the results modification module 46 considers if the following variables need to be modified to have a more efficient test:

1) Finding a balance between the peak time domain level and the grms level of the random floor (the sine levels are ideally left fixed).

2) Changes to the resolution bandwidth of the test.

3) Setting the values for confidence and reliability in the confidence and reliability scaling screen. These values affect the table shown in the summary page under simulation of infinite life with a certain confidence and reliability.

4) Scaling the test levels and decreasing the duration. Preservation of the sine tone peak acceleration levels is paramount since these are the highest values in the frequency domain. The next most important level to preserve is the random floor level. This is true because the random floor level is set at a constant level and it will excite any resonances in the test range for the duration of the test. The maximum time domain 0-PK level is the third most important level to preserve because it has the least effect on the part. This ranking of the damaging effects of the different components of a test assume that the user is concerned with testing resonances. If there are other concerns this rank order may not apply. It is up to the user to decide how much to compromise each variable.

This optional modification process provides a mechanism for keeping the deviation of the random floor at a minimum from its original levels. The preferred embodiment would rather compromise the time domain levels than the random floor levels since the random floor levels are always present and exciting the natural frequencies of the engine component part.

The following is an example that explains how to modify the random floor level as a function of the time domain 0-PK level. Referring back to FIG. 10, the ORIG. RANDOM RMS level 354 is the grms level of the random floor that was originally typed in by the user. The actual random floor level for this test is shown in the EQUALIZATION RESULTS box as the CURRENT FLOOR LEVEL 355. Note that the grms level of the random floor was decreased by about a factor of four or −11.84 dB (this the dB DIFF RANDOM value 356 shown in the ACTUAL AND ESTIMATED INPUTS box). The level of the random floor changed because the time domain 0-Pk value 357 entered dictates a total area under the psd, and since the peak of the sine tones is fixed the only other way to adjust the total area is to adjust the level of the random floor. An example calculation fo Rr is as follows:

$$Rr=(P-2*Rs)/4.2=[42.5-2*(18.755)]/4.2=1.188$$

where:

P=0-Pk time domain level;

Rs=The grms level of all of the sinusoidal data; and

Rr=The grms level of the random floor

Since the peak sine levels are kept constant the grms level of the sinusoids are relatively stable in these calculations. Therefore if the user decides to modify the grms level of the random floor say for example from 1.188 to 2, a new value of P must be recalculated:

$$P=4.2*Rr+2*Rs=4.2*2+2*18.755=46.1$$

Referring to FIG. 13, this new value of P is entered into the MAX TIME DOMAIN 0-PK level cell 520 in the ACTUAL AND ESTIMATED INPUTS section of the CONFIDENCE AND RELIABILITY SCREEN and reequalized.

After equalization is completed successfully, the random RMS level 522 should be very close to 2.

The second modification that may be done is changing the resolution bandwidth for the test. If the value for the resolution bandwidth is changed, the equalization procedure must be performed again. Even though the G 2/hz values of the sine tones have changed the peak acceleration levels have remained constant.

The third modification that may be done is setting the confidence and reliability values. When the statistics (i.e., the confidence and reliability values) are added into the calculation method to increase the confidence of the part, either the duration or the amplitude must be increased in order to run the test in a more severe way so that a higher level of confidence is achieved. Increased durations are undesiranle because they are quite costly. Therefore, the amplitudes are increased in order to reduce the total test time. This reduction is based upon the fatigue properties and the slopes of the materials that are to undergo testing.

Referring to FIG. 14, the first value to enter is the CHI^2 value 560 which reflects the number of parts expected to fail (r) and the confidence level of the test (C). This value is a table lookup value using $\underline{X}^2$ (C, 2r+2) to perform the lookup. For zero failures and a confidence level of 90% the chi^2 value 560 is 4.605.

The TEST DURATION (t) 564 is obtained from the DESIRED TEST TIME 562 in the DURATION AND SCALING box (this value will be explained in more detail later). The Weibull slope (b) 568 is the next input. The NUMBER OF TEST PARTS (N) 572 are the number of parts that will be tested. The % RELIABILITY (r) value 576 is then entered. The last cell DURATION AT # OF PARTS (Tt) 580 is the duration of testing that each test part must be subjected, to run the test to the specified conditions and is calculated according to the following equation:

$$Tt=([(-r^b)*\underline{X}^2]/[2*n*Ln(r)])^{\wedge}(1/b)$$

The numbers for the example provide a sample calculation for the equation:

$$Tt=[(-133.77^{\wedge}1.5)*4.605]/[2*4*Ln(0.9)]^{\wedge}(1/1.5)=414.97 \text{ Hours}$$

It is not required to reequalize after these values are modified in any way and will be used in the discussion immediately below of the fourth modification possibility.

The fourth modification that may be done is to scale the duration of the test. Referring to FIG. 15, the first step is to enter the INPUT EXPONENT 600 (0.16 for aluminum and 0.27 for steels for a rough guideline). Next the desired test time can be lowered to decrease the duration of the test and to increase the levels. The TEST LEVEL INCREASE REQUIRED 604 is shown in the equalization results and is the multiplier on the values between the EQUALIZATION RESULTS 608 and the SCALED LEVELS 612. The following equation calculates the gain to be applied to the test specification:

$$G=(Tf/t)^{\wedge}s=(133.77/20)^{\wedge}0.16=1.355$$

where:

G=The gain applied to the specification

Tf=The original test time t=The resultant lab test time s=The scaling slope

Equalization does not need to be executed again after any of the changes on this page. Note that the TEST DURATION 616 in the CONFIDENCE AND RELIABILITY box has automatically changed to reflect the above alterations.

The gain value reported is the multiplier used to increase the amplitude and decrease the duration (an example is shown later how to use this). If the gain is one the peak sine tone levels reported in the table should be the same as the ones entered. This is not true for the random floor data, however the shape should be the same. When the profile is increased the sine tone levels and the random floor are scaled by the same amount to yield the new profile.

It is important to be aware that the scaling may result in test times below the base hours (i.e., time required to demonstrate infinite life). Times may be adjusted to suit the purpose of the test. It is also prudent not to increase the amplitude of the test by more than a factor or two.

Test Specification From the Sine on Random Data Analysis Module

Figure 16A:
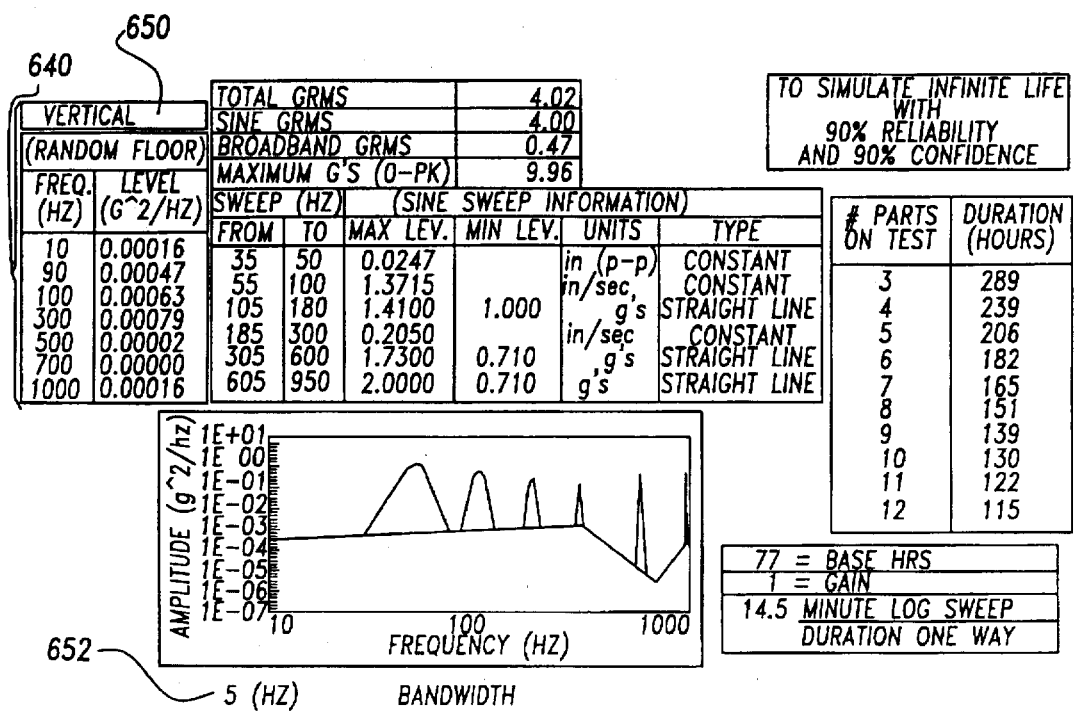
FIGS. 16a–16c show the test specification which is used to specify the operational conditions for conducting a vibrational test upon an engine component.
Figure 16B:
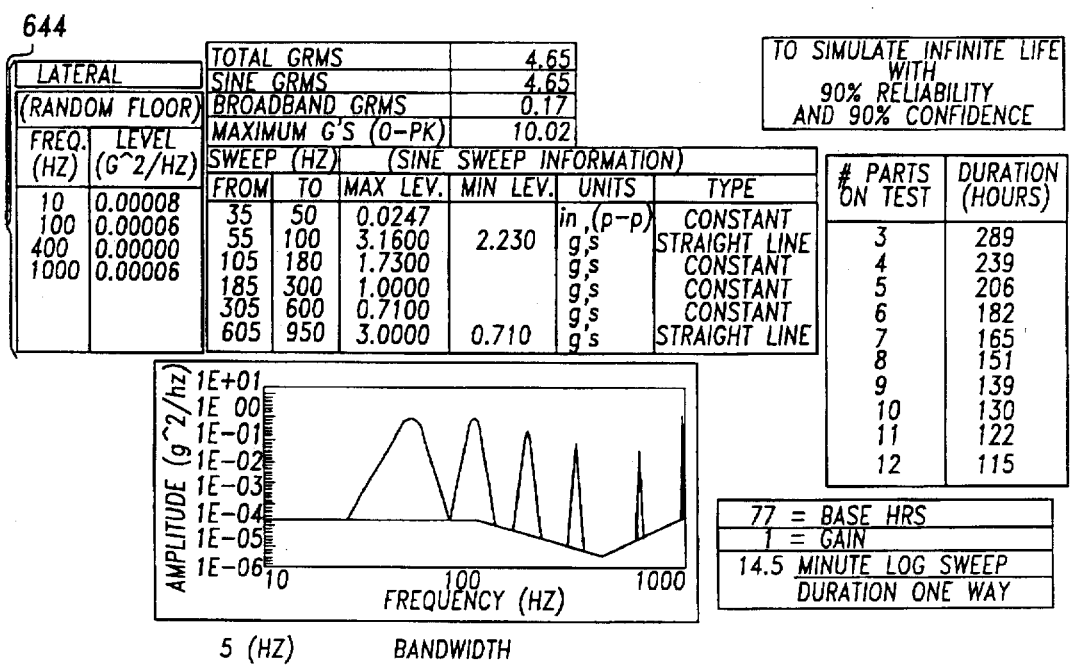
Figure 16C:
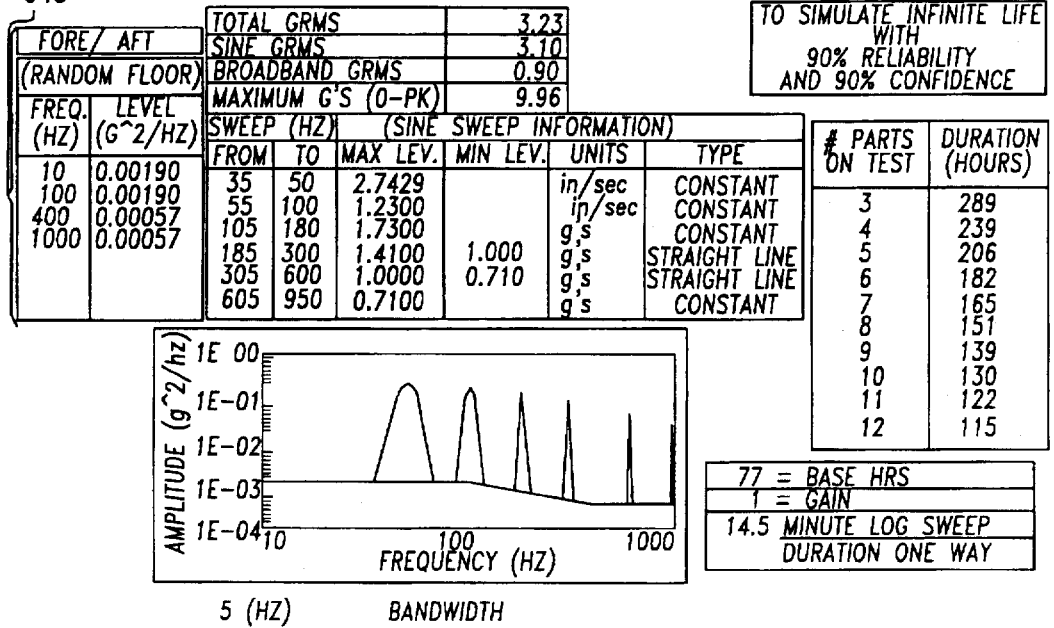

FIGS. 16a–16c depict the test specification which is used to specify the operational conditions for conducting a vibrational test upon an engine component. The test specification shows the three axis of testing an engine component: vertical direction (i.e., up and down) 640 of FIG. 16a, the lateral direction (side-to-side) 644 of FIG. 16b, and the fore and aft direction (front-to-rear) 648 of FIG. 16c.

Referring to FIG. 16c, the information contained between the vertical label 650 and the label 652 of "5 (HZ) BANDWIDTH" comprises all of the data required to program a shaker controller for the vertical direction. The same holds true for the lateral labeled data and the fore/aft labeled data for its respective direction. Each one of these directions is directly analogous to one another so only the vertical description data needs to be described in detail.

Figure 17:
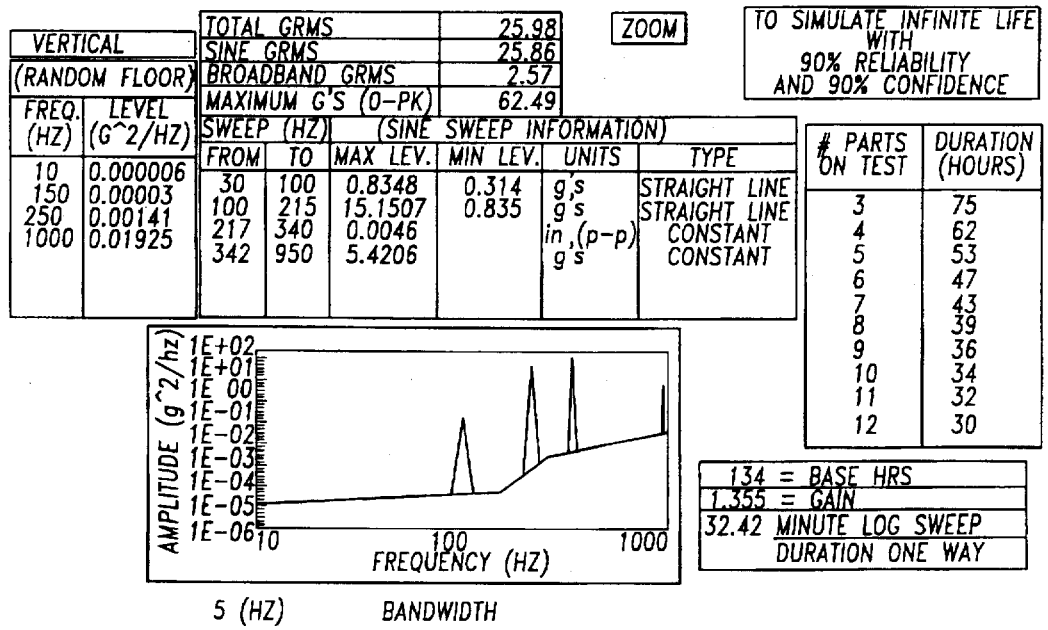
FIG. 17 shows the test specification which is used to specify the operational conditions for conducting a vertical vibrational test upon an engine component.

FIG. 17 depicts the test specification which is used to specify the operational conditions for conducting a vertical vibrational test upon an engine component. The data in the small box on the lower right contains the base hours, gain and the sweep duration one way. The base hours is the duration calculated to simulate infinite life. If the test is run to this total duration the test will at least accumulate the specified amount of cycles in each half power bandwidth in the test frequency range (see duration calculations and results).

Other Aspects of the Present Invention

This method can also be used to develop sine on random dwell (non-sweeping) test. This can be accomplished by entering the dwell frequency as the maximum frequency of the sweep and ignoring the lower frequency.

The unscaled test can be used at the base hours or the test can be scaled without including the confidence and reliability calculations. This can be done by simply running the test to the scaled levels and to the DESIRED TEST TIME that is manually entered.

Those skilled in the art can now appreciate from the foregoing description that the broad teachings of the present invention can be implemented in a variety of forms. Therefore, the foregoing discussion discloses and describes an exemplary embodiment of the present invention. One skilled in the art will readily recognize from such discussion, and from the accompanying drawings and claims, that various changes, modifications and variations can be made therein without departing from the spirit and scope of the invention as defined in the following claims.

It is claimed:

1. An apparatus for operating vibrational testing equipment to conduct a vibrational test upon a physical object, said physical object exhibiting acceleration characteristics and fatigue characteristics, said acceleration characteristics including first peak time domain value, comprising:

peak hold envelope data generation means for generating peak hold envelope data representative of peak hold values of said acceleration characteristics;

first random floor data generation means for generating first random floor data representative of random noise level of said acceleration characteristics;

sine tone data generation means connected to said peak hold envelope data generation means and to said first random floor data generation means for generating sine tone data from said acceleration characteristics that substantially approximate said peak hold envelope data, said sine tone data representing at least a sine tone and intersection values between said sine tone and said first random floor data;

equalization iterative solution determining means for determining second random floor data by an iterative equalization relationship, said iterative equalization relationship maintaining constant said peak hold envelope data and iteratively varying data indicative of area of said first random floor data in accordance with both said first peak time domain value and data indicative of area of said sine tone data; and vibrational testing specification generation means coupled to said equalization iterative solution determining means and to sine tone data generation means for specifying testing parameters to operate said vibrational testing equipment upon said physical object in accordance with said sine tone data and said second random floor data.

2. The apparatus of claim 1 further including: instantaneous acceleration data generation means for generating instantaneous acceleration data as a function of frequency and at particular vibration levels, said instantaneous acceleration data being representative of said acceleration characteristics; and first random floor data selection means connected to said instantaneous acceleration data generation means for selecting said first random noise data whereby area below said instantaneous acceleration data is a maximum.

3. The apparatus of claim 2 further including:

instantaneous acceleration data generation means for generating instantaneous acceleration data as a function of frequency and at particular vibration levels, said instantaneous acceleration data being representative of said acceleration characteristics; and sine tone selection means coupled to said peak hold envelope data generation means for selecting said sine tone whereby amplitude of said sine tone substantially approximates said peak hold envelope data.

4. The apparatus of claim 1 further including: instantaneous acceleration data generation means for generating instantaneous acceleration data as a function of frequency and at particular vibration levels, said instantaneous acceleration data being representative of said acceleration characteristics; and sine tone selection means coupled to said peak hold envelope data generation means for selecting said sine tone whereby amplitude of said sine tone substantially approximates said peak hold envelope data.

5. The apparatus of claim 1 further including: reliability testing levels determination means for establishing a reliability testing levels for said vibrational test, said reliability testing levels including test reliability data and test confidence data; and test duration determination means coupled to said reliability testing levels determination means for determining the duration of the test in accordance with said reliability testing levels.

6. The apparatus of claim 1 further including: first test time determination means for determining first test time based upon relationship between said first test time and said sine tone data;

second test time determination means for determining a second test time of shorter duration than said first test time;

gain determination means for determining a gain value based on said data indicative of fatigue of said physical object and said first test time and said second test time; and scaling determination means for scaling said sine tone data and said second random floor data based on said gain value.

7. An apparatus for operating vibrational testing equipment to conduct a vibrational test upon a physical object, said physical object exhibiting acceleration characteristics and fatigue characteristics, said acceleration characteristics including first peak time domain value, comprising:

peak hold envelope data generation means for generating peak hold envelope data representative of peak hold values of said acceleration characteristics;

first random floor data generation means for generating first random floor data representative of random noise level of said acceleration characteristics;

sine tone data generation means connected to said peak hold envelope data generation means and to said first random floor data generation means for generating sine tone data from said acceleration characteristics that substantially approximate said peak hold envelope data, said sine tone data representing at least a sine tone and intersection values between said sine tone and said first random floor data;

equalization iterative solution determining means for determining second random floor data by an iterative equalization relationship, said iterative equalization relationship maintaining constant said peak hold envelope data and iteratively varying data indicative of area of said first random floor data in accordance with both said first peak time domain value and data indicative of area of said sine tone data;

third random floor determination means for determining third random floor data based upon said second random floor and a predefined random floor threshold;

second peak time determination means for determining second peak time domain based on a relationship between data indicative of area of said sine tone data and data indicative of area of said third random floor data;

second equalization iterative solution determining means for determining fourth random floor by maintaining constant said peak hold envelope data and varying both data indicative of area of said sine tone data and data indicative of area of said third random floor data in accordance with said second peak time domain value; and vibrational testing specification generation means coupled to said second equalization iterative solution determining means and to sine tone data generation means for specifying testing parameters to operate said vibrational testing equipment upon said physical object in accordance with said sine tone data and said fourth random floor data.

8. An apparatus for operating vibrational testing equipment to conduct a vibrational test upon a physical object, said physical object exhibiting acceleration characteristics, said acceleration characteristics including first peak time domain value, comprising:
- peak hold envelope data generation means for generating peak hold envelope data representative of peak hold values of said acceleration characteristics;
- first random floor data generation means for generating first random floor data representative of random noise level of said acceleration characteristics;
- sine tone data generation means connected to said peak hold envelope data generation means and to said first random floor data generation means for generating sine tone data from said acceleration characteristics that substantially approximate said peak hold envelope data, said sine tone data representing at least a sine tone and intersection values between said sine tone and said first random floor data;
- equalization iterative solution determining means for determining a second random floor by maintaining constant said peak hold envelope data and varying both data indicative of area of said sine tone data and data indicative of area of said first random floor data in accordance with said first peak time domain value; and
- vibrational testing specification generation means coupled to equalization iterative solution determining means and to peak hold envelope data generation means and to sine tone data generation means for specifying testing parameters to operate said vibrational testing equipment upon said physical object in accordance with said sine tone data and said second random floor data.

9. A computer-implemented method for operating vibrational testing equipment to conduct a vibrational test upon a physical object, said physical object exhibiting acceleration characteristics and fatigue characteristics, said acceleration characteristics including first peak time domain value, comprising:
- generating peak hold envelope data representative of peak hold values of said acceleration characteristics;
- generating first random floor data representative of random noise level of said acceleration characteristics;
- generating sine tone data from said acceleration characteristics that substantially approximate said peak hold envelope data, said sine tone data representing at least a sine tone and intersection values between said sine tone and said first random floor data;
- determining second random floor data by an iterative equalization relationship, said iterative equalization relationship maintaining constant said peak hold envelope data and iteratively varying data indicative of area of said first random floor data in accordance with both said first peak time domain value and data indicative of area of said sine tone data; and
- specifying testing parameters to operate said vibrational testing equipment upon said physical object in accordance with said sine tone data and said second random floor data.

10. The method of claim 9 further comprising the steps of:
- generating instantaneous acceleration data as a function of frequency and at particular vibration levels, said instantaneous acceleration data being representative of said acceleration characteristics; and
- selecting said first random noise data whereby area below said instantaneous acceleration data is a maximum.

11. The method of claim 10 further comprising the steps of:
- generating instantaneous acceleration data as a function of frequency and at particular vibration levels, said instantaneous acceleration data being representative of said acceleration characteristics; and
- selecting said sine tone whereby amplitude of said sine tone substantially approximates said peak hold envelope data.

12. The method of claim 9 further comprising the steps of:
- generating instantaneous acceleration data as a function of frequency and at particular vibration levels, said instantaneous acceleration data being representative of said acceleration characteristics; and
- selecting said sine tone whereby amplitude of said sine tone substantially approximates said peak hold envelope data.

13. The method of claim 9 further comprising the steps of:
- establishing a reliability testing levels for said vibrational test, said reliability testing levels including test reliability data and test confidence data; and
- determining the duration of the test in accordance with said reliability testing levels.

14. The method of claim 9 further comprising the steps of:
- determining first test time based upon relationship between said first test time and said sine tone data;
- determining a second test time of shorter duration than said first test time;
- determining a gain value based on said data indicative of fatigue of said physical object and said first test time and said second test time; and
- scaling said sine tone data and said second random floor data based on said gain value.

15. A computer-implemented method for operating vibrational testing equipment to conduct a vibrational test upon a physical object, said physical object exhibiting acceleration characteristics and fatigue characteristics, said acceleration characteristics including first peak time domain value, comprising:
- generating peak hold envelope data representative of peak hold-values of said acceleration characteristics;
- generating first random floor data representative of random noise level of said acceleration characteristics;
- generating sine tone data from said acceleration characteristics that substantially approximate said peak hold envelope data, said sine tone data representing at least a sine tone and intersection values between said sine tone and said first random floor data; determining second random floor data by an iterative equalization relationship, said iterative equalization relationship maintaining constant said peak hold envelope data and iteratively varying data indicative of area of said first random floor data in accordance with both said first peak time domain value and data indicative of area of said sine tone data;
- determining third random floor data based upon said second random floor and a predefined random floor threshold; determining second peak time domain based on a relationship between data indicative of area of said sine tone data and data indicative of area of said third random floor data;
- determining fourth random floor by maintaining constant said peak hold envelope data and varying both data indicative of area of said sine tone data and data indicative of area of said third random floor data in accordance with said second peak time domain value; and specifying testing parameters to operate said vibrational testing equipment upon said physical object in accordance with said sine tone data and said fourth random floor data.

16. A computer-implemented method for operating vibrational testing equipment to conduct a vibrational test upon a physical object, said physical object exhibiting acceleration characteristics, said acceleration characteristics including first peak time domain value, comprising:

generating peak hold envelope data representative of peak hold values of said acceleration characteristics;

generating first random floor data representative of random noise level of said acceleration characteristics;

generating sine tone data from said acceleration characteristics that substantially approximate said peak hold envelope data, said sine tone data representing at least a sine tone and intersection values between said sine tone and said first random floor data;

determining a second random floor by maintaining constant said peak hold envelope data and varying both data indicative of area of said sine tone data and data indicative of area of said first random floor data in accordance with said first peak time domain value; and specifying testing parameters to operate said vibrational testing equipment upon said physical object in accordance with said sine tone data and said second random floor data.

* * * * *